United States Patent [19]
Stokes

[11] Patent Number: 5,638,308
[45] Date of Patent: Jun. 10, 1997

[54] CALCULATOR WITH KEYS WHICH CAN SELECTIVELY BE DISABLED

[76] Inventor: William T. Stokes, 1125 Robin Way, Sunnyvale, Calif. 94087

[21] Appl. No.: 361,815

[22] Filed: Dec. 22, 1994

[51] Int. Cl.[6] ................................................ G06F 3/00
[52] U.S. Cl. ........................................... 364/709.01
[58] Field of Search ..................... 364/709.01, 709.14; 434/201, 202, 365

[56] References Cited

U.S. PATENT DOCUMENTS

| | | | |
|---|---|---|---|
| 4,154,007 | 5/1979 | Judd | 434/365 |
| 4,262,337 | 4/1981 | Jones | 364/709.05 |
| 4,831,569 | 5/1989 | Duriez | 364/709.06 |
| 4,836,786 | 6/1989 | Wong | 434/365 |
| 5,020,012 | 5/1991 | Stockberger et al. | 364/709.14 |
| 5,035,502 | 7/1991 | Stokes | 434/365 |

*Primary Examiner*—Tan V. Mai
*Attorney, Agent, or Firm*—Thomas M. Freiburger

[57] ABSTRACT

A portable, preferably pocket-sized electronic calculator includes provision for disabling the use of certain keys on its keyboard. By holding down a number key or certain of the function keys for a predetermined period of time such as two to four seconds, the user can disable the selected number or function. This allows the calculator to be used effectively in teaching factoring and various mathematical properties and leads the student to innovate in substituting different numbers and functions in solving problems in the student's own way. For discontinuing all key disabling a reset key preferably is provided.

14 Claims, 3 Drawing Sheets

1

CALCULATOR WITH KEYS WHICH CAN SELECTIVELY BE DISABLED

BACKGROUND OF THE INVENTION

The invention relates to electronic calculators, specifically to a portable, hand-held calculator, and more particularly to a student calculator which includes a new feature useful in the teaching of mathematics.

Small portable calculators are commonly used in the mathematics classroom today. In many mathematics classes in high schools and elementary schools, each student in a class uses a student calculator and is taught various mathematical functions and manipulations by a teacher using a calculator having similar functions. U.S. Pat. No. 4,154,007 introduced the overhead projectible calculator, with a transparent liquid crystal display for projection onto a screen. Using such a projectible calculator with keyboard layout similar to the students' calculators, the mathematics teacher can show the solving of mathematical problems while instructing students in the classroom. Further refinements have been developed with U.S. Pat. Nos. 4,836,786 and 5,035,502, wherein not only the LCD of the calculator but also the keyboard is transparent and projectible. Thus, the students see not only the LCD as projected, but also the instructor's entries onto the keyboard.

Such projectible calculators have made great progress in furthering the use of electronic calculators in the teaching of mathematics. However, in the field of classroom calculators there has been a need for an effective teaching tool which can be used to direct students in learning alternative mathematical manipulations to achieve a given result, helping to teach factoring and the associative and distributive properties in mathematics. This is the purpose of the present invention described below.

SUMMARY OF THE INVENTION

The ability to teach students mathematics, while at the same time allowing and teaching the use of calculators, is broadened by the new calculators according to this invention. With the new calculators a mathematics teacher can assign students a problem involving several of the common functions—addition, subtraction, multiplication and division—then instruct the students to disable one or more numbers or mathematical functions. The students are thus forced to devise and learn alternative manipulations to arrive at the same result.

As a very simple example, students may be instructed to disable the 8 key, then to solve the problem 8+18. The student can mentally factor each number in such a way as not to require use of the 8 key. The student thus arrives at (2×4)+(2×9). The student can use the distributive property to factor out the like 2s; 2×(4+9), which can be expressed as 2×13=26. As another example, the teacher might assign a problem 6×3×12÷4+48, the result divided by 78. If the students are then instructed to disable the number key 8, several of these manipulations will have to be performed in alternative ways. For example, the division by 78 could be accomplished by factoring 78 into 6×13, thus dividing by 6 and 13 successively. Alternatively, the student could divide by 2 and 39 successively, or 3 and 26 successively. If the students are instructed to disable the multiplication function key, they will have to use addition in place of multiplication for several of the above problem steps. Disabling of number keys, of numbers involved in an assigned problem, can help teach the student the distributive property of multiplication over addition.

The teacher can instruct students to disable the square root key, then assign the students to find the square root of one or more numbers. The student will learn to "bracket" the solution by squaring numbers repeatedly, finally narrowing to the solution as confirmed by reviewing the new squared product on each iteration. This exercise helps the student appreciate what is done by the calculator in extracting square roots.

It is therefore seen that the calculator of the invention, with key disabling, teaches the student to problem solve around the disabled key. This actually holds true in the same way as in the case where no calculator is used, but the student works out a problem on paper without using certain digits or numbers. Whether or not a calculator is used by the student, such an exercise is pedagogically sound in math education.

Calculators according to the invention are constructed generally similarly to typical conventional classroom calculators having the same mathematical functions. Key disabling, although it may be accomplished by simple dip switches on the back of the calculator, in a more preferred embodiment of the calculator is effected by holding down a key which is to be disabled, for a pre-programmed duration which may be two to four seconds. The internal microprocessor chip of the calculator has programming to switch off any of the keys wherein disablement is provided, by sensing the holding of such a key for the predetermined period of time. In the case of the arithmetic function keys, e.g. addition, subtraction, multiplication, division, square root and percent, the liquid crystal display of the calculator preferably displays each of these functions when the corresponding key is pressed. Similarly, the pressing of any numerical key zero through nine will cause that numeral to be displayed on the LCD. To confirm to the student that a key has been disabled, the LCD symbol showing the number or function will appear on the LCD when the key is initially pressed, but will then disappear after the predetermined hold-down period for disabling of the key. The microprocessor is programmed to control the display in this way.

It is therefore seen that calculators according to this invention present a new approach and many new possibilities for the teaching of mathematics to students while at the same time allowing and teaching the use of electronic calculators. These and other objects, advantages and features of the invention will be apparent from the following description of a preferred embodiment, considered along with the accompanying drawings.

DESCRIPTION OF PREFERRED EMBODIMENTS

Figure 1:
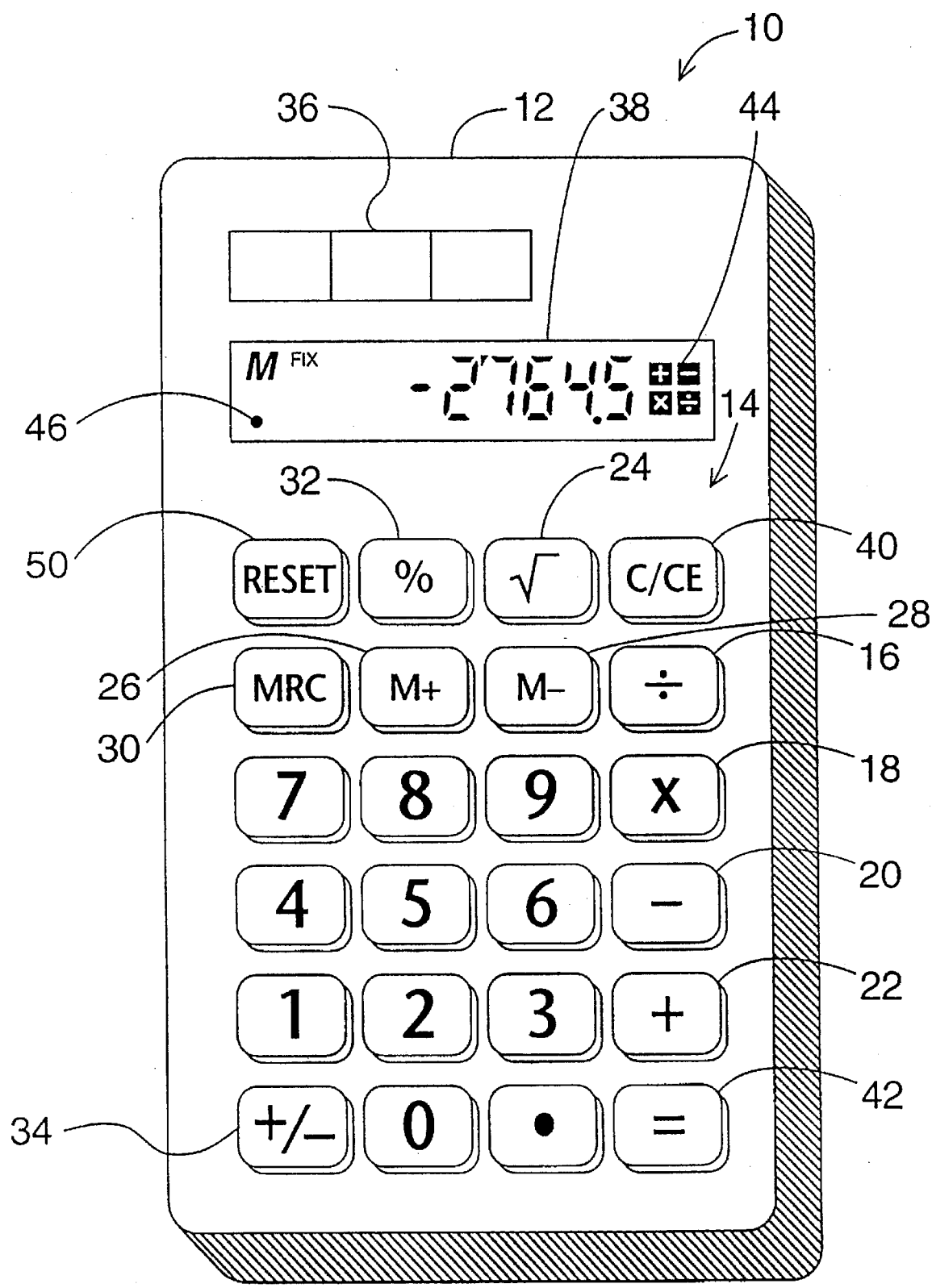
FIG. 1 is a frontal view of a calculator according to the invention, with capability of disabling selected keys of the keyboard.

FIG. 1 shows a calculator 10 of the type commonly known as a four-function calculator, the calculator being designed for classroom use. The calculator 10 preferably is of the typical pocket size, and may be about 5 to 8 centimeters in width by about 9 to 12 centimeters in height. The calculator has a casing 12 which may be about 4 to 9 millimeters in thickness. Dimensions may be smaller if desired, but the keyboard size should be comfortable to use.

As is the usual case with a four-function classroom calculator, this calculator includes a keyboard 14 with a division key 16, multiplication key 18, subtraction key 20 and addition key 22, as well as a square root function key 24. In addition, the calculator may include memory keys 26, 28 and 30, a percent key 32 and a +/− key 34 for changing sign. Although the calculator 10 may be battery-powered, more preferably it includes the typical array of solar cells 36 for powering its internal microprocessor chip and LCD display 38. Thus, a clear entry/clear key 40 is included, without the need for any "on" or "off" key.

In addition to these function keys, the keyboard 14 includes number keys 0 through 9 and the decimal point. An "equals" key 42 is provided, to cause display of the last mathematical operation entered, or to use the "constant" or squaring functions of the calculator.

Figure 1A:
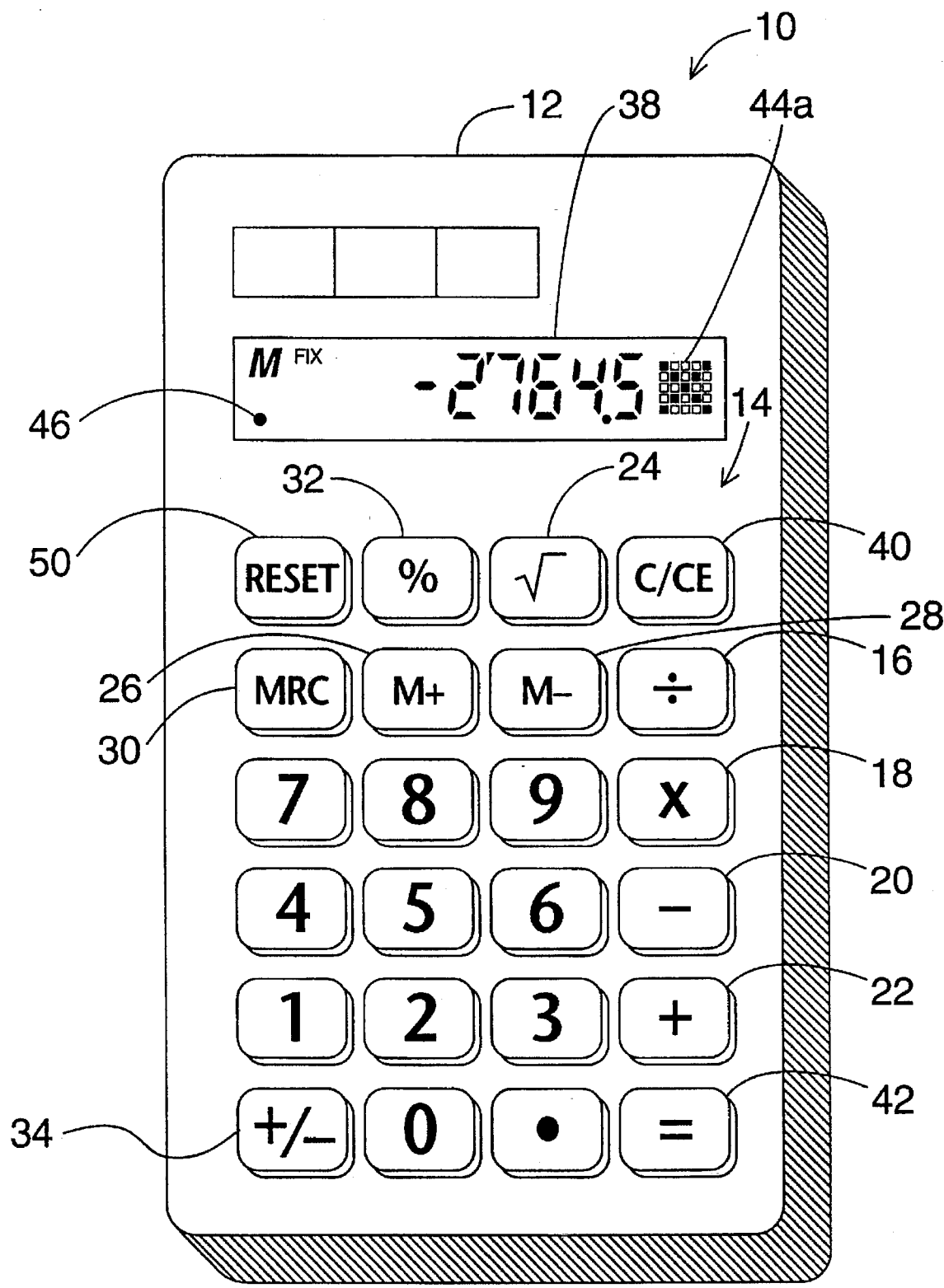
FIG. 1A is similar to FIG. 1 but with a variation in the calculator's display.

As shown on the liquid crystal display 38, the calculator of the invention preferably includes display of arithmetic icons at 44, for addition, subtraction, multiplication and division. A particular icon will appear when the particular operation is selected by depressing of the key. A two by two square arrangement of the individual four functions is shown. Other icon display formats for these functions can be used if desired, such as a dot matrix, shown in FIG. 1A in the form of a five by five matrix 44a. The display 38 also has an indicator or icon 46 which in this embodiment is shown as a simple black dot. The indicator 46 relates to the key-disable function of the calculator of the invention. When the black dot 46 (or other appropriate icon) appears on the display, this indicates that at least one numeral or function key has been disabled.

As described above, although manual switches could be used for disabling selected keys, in the preferred embodiment disabling is accomplished by the straightforward procedure of holding the key down for an unconventionally long period of time. Since a user of a calculator will normally hold down a numeral or function key for a period of considerably less than one second, the disabling threshold may be about two seconds, or it may be up to about four seconds. Any period of time which corresponds to a deliberate effort to hold the key down is sufficient, but in a preferred embodiment this period is about two to four seconds. The user must hold down one key at a time for the threshold disabling period. That will cause the number or function corresponding to the depressed key to be displayed on the display 38 until the threshold time period is reached. At that time the number or function symbol will disappear from the display.

Preferably all of the numeral keys of the calculator 10 are capable of being disabled. In addition, at least the arithmetic function keys 16, 18, 20 and 22 should be capable of disabling. Like the numerals, these are displayed (at 44) when pressed, then disappear when the time threshold is reached. In one preferred embodiment all of the normal function keys can be disabled, with the exception of the CE/C key 40, the memory keys 26–30 and the "equals" key 42, as well as the decimal point.

By disabling the [%] key, the student will be forced into changing 50% value into 0.50 by mentally removing the percent sign and moving the decimal point two places to the left (i.e. expressing 50% as 50 hundredths).

To restore the function of all keys, in the preferred embodiment a reset key 50 is included on the keyboard. This will restore all functions and numerals which have been disabled, and the black indicator dot 46 on the display will disappear. This can in fact comprise a power off function which sets all registers to zero. Although provision could be made to accomplish this function through use of the CE/C key 40 (pressing twice), without providing a reset key 50, it is preferred that the CE/C key function in the normal way, clearing numbers for a new problem and not resetting disabled keys.

The improved classroom calculator of the invention, in a preferred embodiment, has a combination of additional specific operating features, some of which have individually been included in higher-level calculators in the past, and some of which are new with this calculator. These features include the negative sign's being displayed as a floating sign; condensed numerals in the display being 8 to 9 mm in height; grouping of each three digits by an apostrophe or caret; expressing percent as a decimal, when the percent key is pressed after a number. Also, use of the percent key for addition or subtraction of percentages will involve a different display. Pressing [60] [+] [25] [%] first displays 15, then pressing [=] yields 75. Further, with the square root function, if a negative value is displayed, then the square root key is pressed, the word "ERROR" will appear, centered in the display, without showing any mathematical answer. Further, when the square root of a number is calculated using the square root key, its root shall be returned to the original number value using the [X] [=] keys (rather than returning to an approximating decimal). As an example, if √5 is extracted and 2.2360679 is displayed, then pressing [X] [=] will display 5.

When either memory key (26 or 28) is pressed, an "M" 52 will appear in the upper left corner of the display.

Also, the processor will round off decimals. 2÷3 will be displayed as 0.6666667. Upon clearing the calculator, the display shall show only a 0, without decimal point. When a decimal number is then entered, it will be shown as 0.[number]. Further, the decimal point may be fixed to a designated number of places by holding down the decimal point key until it disappears on the display, then by entering a digit for the fixed number of places desired. This will fix the decimal point at the position desired and will turn on a "FIX" icon 54. For example, if the decimal point is pressed for three seconds, the decimal point will disappear in the display, then the operator may press 2 for a two-place fix, thereby making addition and subtraction of money problems easier. The display will show 0.00. If more than seven places are attempted to be fixed, then the "ERROR" message will appear. To cancel the fixed decimal point and return to a floating point, the user simply presses the "RESET" key.

Another preferred feature carried out by the internal processor of the calculator 10 is that all basic operations (addition, subtraction, multiplication and division) will automatically operate under conventional algebraic logic, so that, as an example, 4+3×5 shall equal 19.

Figure 2:
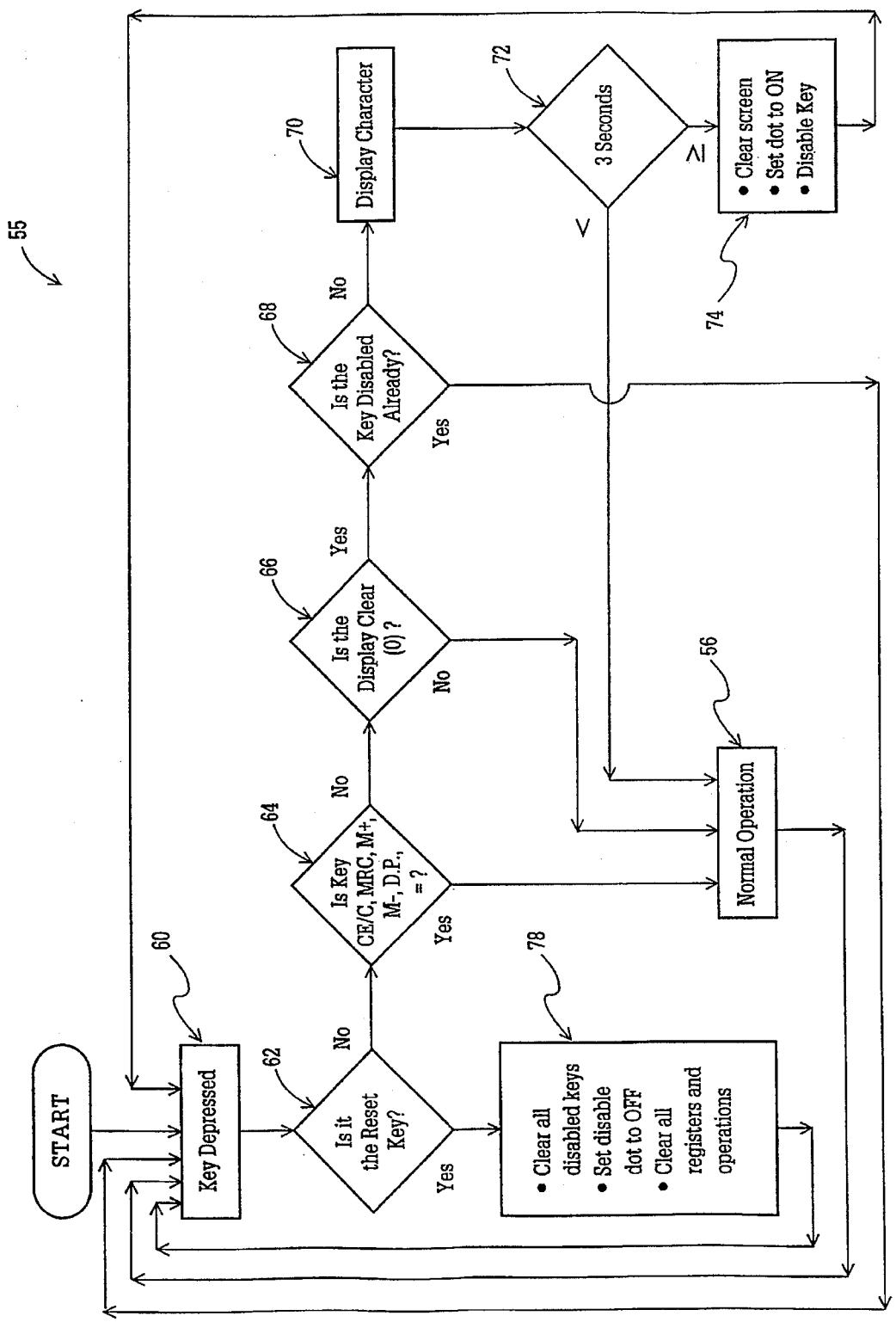
FIG. 2 is a flow chart outlining some of the logic which forms a part of the programming of a microprocessor chip included in the calculator, for the purpose of disabling and resetting keys.

FIG. 2 indicates some of the logic of the internal microprocessor chip (not shown) of the calculator 10, in simplified flow chart form, relating to the key-disabling and resetting process.

The flow chart 55 of FIG. 2 is not comprehensive in showing the interrelationship of the disable and reset functions with the normal operation of the calculator. Normal operation is indicated at the block 56.

As shown in the flow chart 55, when a key is depressed, as indicated in the block 60, if the key is not the reset key (decision block 62); and if the key is not one of the keys not capable of disabling (CE/C, MR, M−, M+, =, or decimal point), as shown in decision block 64; and if the display is clear (block 66); and if that particular key is not currently disabled (decision block 68), the character represented by the key is displayed, as noted in the block 70. If the key is held down for the threshold period as discussed above, shown here as three seconds in the decision block 72, the process goes to the block 74, i.e. the screen is cleared of the displayed character or icon, the disable dot 46 is displayed and the number is disabled. The flow chart then shows return to "key depressed" 60, indicating that another key will be depressed in carrying out mathematical calculations, without use of the disabled key.

The chart 55 also shows that if, at decision block 62, the reset key is the key which has been depressed (50 in FIG. 1), this will clear (reset to operational) all disabled keys as indicated in the block 78. At the same time, the disable dot (46 in FIG. 1) is turned off and all registers and operations are cleared. As noted above, in a preferred embodiment the reset key will also reset the decimal point, as no longer fixed. The chart now flows back to the "key depressed" block 60, indicating that another key will be depressed in the normal use of the calculator.

At the decision block 64, if the depressed key, which is held down for the threshold period of time, is one of the keys not capable of disabling (CE/C, MR, M–, M+, =, or decimal point), then normal operation involving the depressed key will take place, as indicated at the block 56. The loop returns to "key depressed" 60, indicating that the next step will be to depress another key.

At the decision block 66, if the display is not clear, i.e. displaying zero (or displaying nothing except the disable dot in the case another key has just been disabled), then normal operation of the key continues, as indicated by flow to the block 56. It is preferred that the processor operate the disable function in this way, requiring a clear screen and no numbers stored or calculations in progress. However, the processor could have logic to operate at a slightly more sophisticated level wherein, if a number and an arithmetic operation (+, ×, etc.) have been entered, or a result has already been calculated and is displayed, a digit entered and held at this point could be disabled.

At the decision block 68, if the key which has been depressed is a key which has already been disabled, then there will be no display of this depressed key, and the flow is back to "key depressed" 60, indicating that the next step will be to depress another key.

At the decision block 72, if the depressed key is not held down for the threshold period, then the flow indicates normal operation of this key at the block 56, and returning to "key depressed", indicating a further key will be depressed.

It is therefore seen that the invention provides a function allowing the user to disable one or more number or operation keys that will then challenge the user to perform certain given algorithms in such a manner that avoids the use of those disabled keys.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. An electronic calculator for teaching mathematics through the performance of mathematical computations, comprising:

a calculator casing having a display means and a keyboard including function keys and number keys, internal processor means within the casing, for carrying out functions as desired by a user operating the keyboard and for displaying the results of operations, as well as indicating at least some of the functions as selected by the user, on the display means, means for supplying power to the internal processor means and display means, and disabling means for allowing the deliberate and selective disabling of one or more of the keys of the calculator as selected by the user, whereby the disabled keys must be bypassed in performing mathematical computations.

2. The calculator of claim 1, wherein the disabling means comprises means associated with the internal processor means for disabling a key as selected by the user, upon the user's depressing and holding the key for a predetermined period of time.

3. The calculator of claim 2, wherein said predetermined period of time is about two to four seconds.

4. The calculator of claim 2, wherein the disabling means further includes means for displaying a number, when a corresponding number key is depressed and held, for the duration of said predetermined time period, and then for causing the displayed number to disappear from the display, indicating the number key has been disabled.

5. The calculator of claim 1, wherein the disabling means includes means allowing said selective disabling of each of the number keys.

6. The calculator of claim 1, wherein the disabling means includes means for said selective disabling of at least some of the number keys and at least some of the function keys of the calculator.

7. The calculator of claim 6, wherein the function keys capable of disabling include addition, subtraction, multiplication and division keys.

8. The calculator of claim 7, wherein disabling means further includes means for selective disabling of a square root key and a percent key.

9. The calculator of claim 1, further including a reset key on the keyboard, and means connected to the reset key and the internal processor means for discontinuing disabling of any keys which have been disabled, upon the user's pressing of the reset key, without changing the numerical display on the display means.

10. The calculator of claim 1, wherein the display means and the internal processor means include means for indicating on the display means that at least one key has been selectively disabled on the calculator.

11. The calculator of claim 1, wherein the means for supplying power includes a solar panel on the calculator casing.

12. The calculator of claim 1, wherein the display means comprises an LCD.

13. A method for teaching certain aspects of mathematics wherein the student or students use electronic calculators, comprising:

providing each student with an electronic calculator having disabling means for manually selectively disabling keys of the calculator's keyboard, instructing a student to disable one or more keys of the calculator, and giving the student a problem or exercise involving mathematical manipulations, which manipulations if accomplished in a most straightforward way, involve the use of at least one of the keys which are to be disabled, the student's disabling the key as instructed, using the disabling means, and the student's working through the exercise by performing calculations on the calculator without the use of the disabled key or keys, thereby teaching the student to devise alternative ways for carrying out particular mathematical manipulations, and helping teach the student substitution, factoring and the associative and distributive properties of mathematics.

14. The method of claim 13, wherein the student's disabling of the selected keys is accomplished by pressing down and holding the particular keys to be disabled, for a predetermined period of time which is received in the processor of the calculator as an instruction to disable the key.

* * * * *